US009783624B2

(12) United States Patent
Merlo et al.

(10) Patent No.: US 9,783,624 B2
(45) Date of Patent: Oct. 10, 2017

(54) PROCESS FOR THE TREATMENT OF SULFONYL FLUORIDE POLYMERS

(71) Applicant: SOLVAY SPECIALTY POLYMERS ITALY S.P.A., Bollate (IT)

(72) Inventors: Luca Merlo, Montorfano (IT); Alessandro Veneroni, Novate Milanese (IT); Elvira Pagano, Milan (IT); Claudio Oldani, Nerviano (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 107 days.

(21) Appl. No.: 14/574,758

(22) Filed: Dec. 18, 2014

(65) Prior Publication Data

US 2015/0197589 A1 Jul. 16, 2015

Related U.S. Application Data

(62) Division of application No. 13/704,335, filed as application No. PCT/EP2011/060396 on Jun. 22, 2011, now Pat. No. 8,940,846.

(30) Foreign Application Priority Data

Jul. 1, 2010 (EP) .................................... 10168126

(51) Int. Cl.

| | |
|---|---|
| ***C08F 128/02*** | (2006.01) |
| ***C08F 228/02*** | (2006.01) |
| ***C08F 116/14*** | (2006.01) |
| ***B01D 71/32*** | (2006.01) |
| ***B01D 71/68*** | (2006.01) |
| ***C08F 214/18*** | (2006.01) |
| ***C08J 5/18*** | (2006.01) |
| ***C08J 5/22*** | (2006.01) |
| ***H01M 8/1027*** | (2016.01) |
| ***C08F 261/06*** | (2006.01) |

(52) U.S. Cl.

CPC ............ *C08F 116/14* (2013.01); *B01D 71/32* (2013.01); *B01D 71/68* (2013.01); *C08F 128/02* (2013.01); *C08F 214/182* (2013.01); *C08F 228/02* (2013.01); *C08F 261/06* (2013.01); *C08J 5/18* (2013.01); *C08J 5/2237* (2013.01); *H01M 8/1027* (2013.01); *C08J 2327/18* (2013.01); *H01M 2300/0082* (2013.01)

(58) Field of Classification Search

USPC .......................................... 526/243; 204/252

See application file for complete search history.

(56) References Cited

U.S. PATENT DOCUMENTS

| | | | | |
|---|---|---|---|---|
| 4,414,338 | A | 11/1983 | Kimoto et al. | |
| 4,940,525 | A * | 7/1990 | Ezzell | B32B 27/32 204/252 |
| 8,940,846 | B2 * | 1/2015 | Merlo | B01D 71/32 204/252 |
| 2004/0019237 | A1 * | 1/2004 | Cherstkov | C07C 17/093 562/824 |
| 2005/0043487 | A1 | 2/2005 | Felix et al. | |
| 2010/0087553 | A1 * | 4/2010 | Arcella | C08F 8/22 521/27 |

FOREIGN PATENT DOCUMENTS

| | | | |
|---|---|---|---|
| EP | 1167400 | A1 * | 1/2002 |
| EP | 1172382 | A2 | 1/2002 |
| EP | 1323751 | A2 | 7/2003 |
| EP | 1873860 | A1 * | 1/2008 |
| EP | 1914251 | A1 | 4/2008 |
| WO | 2006119224 | A1 | 11/2006 |
| WO | WO-2006/119224 | A1 * | 11/2006 |

OTHER PUBLICATIONS

Standard ASTM D3418-08 “Standard Test Method for Transition Temperatures and Enthalpies of Fusion and Crystallization of Polymers by Differential Scanning Calorimetry”, 2008, pp. 1-7; 7 pgs.

* cited by examiner

*Primary Examiner* — Mark Kaucher
*Assistant Examiner* — Henry Hu

(57) ABSTRACT

A process for reducing the amount of soluble polymeric fractions in a sulfonyl fluoride polymer. The process comprises contacting the sulfonyl fluoride polymer with a fluorinated fluid followed by separation of the polymer from the fluid. The fluorinated fluid is selected from hydrofluoroethers and hydrofluoropolyethers. The invention further relates to sulfonyl fluoride polymers obtainable by the process and having a heat of fusion not exceeding 4 J/g and containing less than 15% by weight of polymeric fractions having an average content of monomeric units comprising a sulfonyl functional group exceeding 24 mole %. The sulfonyl fluoride polymers so obtained are particularly suitable for the preparation of ionomeric membranes for use in electrochemical devices.

7 Claims, No Drawings

PROCESS FOR THE TREATMENT OF SULFONYL FLUORIDE POLYMERS

CROSS-REFERENCE TO RELATED APPLICATIONS

This application is a divisional application of U.S. application Ser. No. 13/704,335, filed Dec. 14, 2012, which is a U.S. national stage entry under 35 U.S.C. §371 of International Application No. PCT/EP2011/060396 filed Jun. 22, 2011, which claims priority to European application No.10168126.0 filed on Jul. 1, 2010. The entire contents of these applications are explicitly incorporated herein by this reference.

TECHNICAL FIELD

The invention relates to a process for the treatment of fluorinated polymers containing sulfonyl fluoride functional groups suitable to improve the use of said polymers for the preparation of polymeric membranes for electrochemical devices.

BACKGROUND ART

Fluorinated polymers containing sulfonyl fluoride functional groups are known in the prior art as precursors for a class of ion exchange fluorinated polymers generally referred to as "ionomers".

Due to their ionic properties, fluorinated ionomers are suitable in the manufacture of electrolyte membranes for electrochemical devices such as fuel cells, electrolysis cells, lithium batteries.

Fuel cells are electrochemical devices that produce electricity by catalytically oxidizing a fuel, such as hydrogen or methanol. Among known fuel cells of particular interest are proton exchange membrane (PEM) fuel cells which employ hydrogen as the fuel and oxygen or air as the oxidant. In a typical PEM fuel cell, hydrogen is introduced into the anode portion, where hydrogen reacts and separates into protons and electrons. The membrane transports the protons to the cathode portion, while allowing a current of electrons to flow through an external circuit to the cathode portion to provide power. Oxygen is introduced into the cathode portion and reacts with the protons and electrons to form water and heat.

An important requirement for the long-term functioning of a PEM fuel cell is the ability of the membrane to maintain suitable water content in the membrane itself to ensure the required level of ion conductivity. It is important that, while in operation, the membrane maintains a high proton transport capability and efficiently transfers water generated during the cell operation from one side of the membrane to the other.

Ionomers deriving from fluorinated polymers containing sulfonyl fluoride functional groups having a heat of fusion not exceeding 4 J/g have shown to possess advantageous properties in terms of both proton and water transport capability. In general, the higher the amount of monomeric units comprising sulfonyl fluoride functional groups contained in the polymer, the lower the heat of fusion (and consequently the crystallinity of the polymer) and the higher the ionic conductivity of the membranes obtained therefrom.

Said polymers however have the drawback that when transformed into ionomeric membranes and used in e.g. a fuel cell they tend to progressively lose weight during the lifetime of the cell.

It would therefore be desirable to have sulfonyl fluoride polymers having a heat of fusion not exceeding 4 J/g and having an increased durability when transformed into a membrane for a fuel cell application.

SUMMARY OF THE INVENTION

The Applicant has now developed a process for the treatment of sulfonyl fluoride polymers that allows to obtain such an objective, said process comprising the treatment of sulfonyl fluoride polymers with a fluorinated fluid selected from the group consisting of hydrofluoroethers and hydrofluoropolyethers. In an aspect of the inventive process the sulfonyl fluoride polymer is in solid form.

The Applicant has found that sulfonyl fluoride polymers having a heat of fusion not exceeding 4 J/g after being subjected to the inventive treatment contain less than 15% by weight of polymeric fractions in which the average content of monomeric units comprising at least one sulfonyl fluoride group is greater than 24 mole %.

Without being bound by theory the Applicant believes that a low amount (lower than 15% by weight) of polymeric fractions having an average content of monomeric units comprising at least one sulfonyl fluoride group greater than 24 mole % in the sulfonyl fluoride polymer used in the preparation of an ionomeric membrane provides for increased durability of the membrane itself.

A second objective of the present invention is a sulfonyl fluoride polymer having a heat of fusion not exceeding 4 J/g and containing less than 15% by weight of polymeric fractions in which the average content of monomeric units comprising at least one sulfonyl fluoride group is greater than 24 mole %. In an aspect of the invention the sulfonyl fluoride polymer contains less than 15% by weight of polymeric fractions in which the average content of monomeric units comprising at least one sulfonyl fluoride group is greater than 24.5 mole %. In another aspect of the invention the sulfonyl fluoride polymer contains less than 10% by weight of polymeric fractions in which the average content of monomeric units comprising at least one sulfonyl fluoride group is greater than 25 mole %. In still another aspect of the invention the sulfonyl fluoride polymer contains less than 10% by weight of polymeric fractions in which the average content of monomeric units comprising at least one sulfonyl fluoride group is greater than 25.5 mole %. In still another aspect of the invention the sulfonyl fluoride polymer contains less than 10% by weight of polymeric fractions in which the average content of monomeric units comprising at least one sulfonyl fluoride group is greater than 26 mole %.

A third objective of the invention is a membrane comprising the sulfonyl fluoride polymer of the second objective in acid and/or salified form.

DEFINITIONS

The term "fluorinated" is used herein to refer to compounds (e.g. monomers, polymers etc.) that are either totally or partially fluorinated, i.e wherein all or only a part of the hydrogen atoms have been replaced by fluorine atoms.

The expression "sulfonyl fluoride polymer" is used herein to refer to a fluorinated polymer comprising recurring units of at least one ethylenically unsaturated fluorinated monomer containing at least one sulfonyl fluoride group ($—SO_2F$) (monomer (A) as hereinafter defined) and at least one ethylenically unsaturated fluorinated monomer (monomer (B) as hereinafter defined).

The expression "average content of monomeric units comprising at least one sulfonyl fluoride group" is used herein to indicate the average content of units derived from the at least one monomer (A) in the sulfonyl fluoride polymer.

The term "ionomer" is used in the present application to refer to a fluorinated polymer comprising recurring units derived from at least one ethylenically unsaturated fluorinated monomer comprising at least one ion exchange group $—SO_3^-$ and at least one ethylenically unsaturated fluorinated monomer (monomer (B) as hereinafter defined).

The expressions "acid form" and/or "salified form" of a sulfonyl fluoride polymer are meant to indicate that substantially all the ion exchange groups in the polymer are protonated and/or neutralized.

DETAILED DESCRIPTION OF THE INVENTION

A first object of the present invention is a process for treating a sulfonyl fluoride polymer having a heat of fusion not exceeding 4 J/g, said process capable of reducing to less than 15% with respect to the final polymer weight, the amount of polymeric fractions whose average content of monomeric units comprising at least one sulfonyl fluoride group is greater than 24 mole %.

Accordingly, object of the present invention is a process for reducing to less than 15% by weight the amount of polymeric fractions having an average content of monomeric units comprising at least one sulfonyl fluoride group greater than 24 mole % in a sulfonyl fluoride polymer having a heat of fusion not exceeding 4 J/g, said process comprising the steps of contacting for at least 1 minute said polymer with a fluorinated fluid selected from the group consisting of hydrofluoroethers and hydrofluoropolyethers and separating said fluid from said polymer.

In the remainder of the text, the expression "fluorinated fluid" is understood, for the purposes of the present invention, both in the singular and the plural, in that more than one fluorinated fluid as defined below can be used at any one time.

Hydrofluoroethers and hydrofluoropolyethers suitable for the process of the invention may be selected from those that comply with formula (I A) or (I B) here below:

$$RO—(R_f)_r—R' \quad \text{(I A)}$$

$$RO\text{-}J\text{-}(O)_j—R' \quad \text{(I B)}$$

wherein:

R and R', equal or different from each other, are independently chosen among $—C_mF_{2m+1}$, $—C_nF_{2n+1-h}H_h$, $—C_pF_{2p+1-h'}Y_{h'}$, $—C_zF_{2z}OC_yF_{2y+1}$, $—C_uF_{2u-u'}H_{u'}OC_wF_{2w+1-w'}H_{w'}$, $—C_uF_{2u-u'}H_{u'}OC_yF_{2y+1}$ groups, with m, n, p, u, w, y, z being integers from 1 to 8, preferably from 1 to 7, h, h', u' and w' being integers ≥1, chosen so that h≤2n+1, h'≤2p+1, u'≤2u, w'2w+1, Y being a halogen atom chosen among Cl, Br, I, preferably a chlorine atom, with the proviso that at least one of R and R' in formula (I A) is a $—C_nF_{2n+1-h}H_h$ group or a $—C_uF_{2u-u'}H_{u'}OC_wF_{2w+1-w'}H_{w'}$ group, as defined above;

r is equal to 0 or 1; j is equal to 0 or 1;

$R_f$ is a fluoropolyoxyalkylene chain comprising recurring units $R^o$, said recurring units being chosen among the group consisting of:

(i) —CFXO—, wherein X is F or $CF_3$;

(ii) $—CF_2CFXO—$, wherein X is F or $CF_3$;

(iii) $—CFXCF_2O—$, wherein X is F or $CF_3$;

(iv) $—CF_2CF_2CF_2O—$;

(v) $—CF_2CF_2CF_2CF_2O—$;

(vi) $—(CF_2)_k—CFZ—O—$, wherein k is an integer from 0 to 3 and Z is a group of general formula $—OR_FT_3$, wherein $R_F$ is a fluoropolyoxyalkylene chain comprising a number of recurring units from 0 to 10, said recurring units being chosen among the followings: —CFXO—, $—CF_2CFXO—$, $—CF_2CF_2CF_2O—$, $—CF_2CF_2CF_2CF_2O—$, with each of X being independently F or $CF_3$, and $T_3$ is a $C_1$-$C_5$ perfluoroalkyl group, and mixtures thereof;

J is a divalent hydrocarbon radical having 1 to 12 carbon atoms, linear or branched, aliphatic or aromatic, preferably an aliphatic divalent hydrocarbon group having 1 to 6 carbon atoms, e.g. $—CH_2—$, $—CH_2CH_2—$ or $—CH(CH_3)—$.

Suitable hydrofluoroethers and hydrofluoropolyethers are preferably those that comply with formula (II A) or (II B) here below:

$$R^*O—(R_f)_r—R^{*\prime} \quad \text{(II A)}$$

$$R^*O\text{-}J\text{-}(O)_j—R^{*\prime} \quad \text{(II B)},$$

wherein:

R* and R*', equal or different from each other, are independently chosen among $—C_mF_{2m+1}$, $—C_nF_{2n+1-h}H_h$, $—C_zF_{2z}OC_yF_{2y+1}$, $—C_uF_{2u-u'}H_{u'}OC_wF_{2w+1-w'}H_{w'}$, $—C_uF_{2u-u'}H_{u'}OC_yF_{2y+1}$ groups, with m, u, w, y, z being integers from 1 to 8, preferably from 1 to 7, h, u' and w' being integers≥1, chosen so that h≤2n+1, u'≤2u, w'≤2w+1, with the proviso that at least one of R* and R*' in formula (II A) is a $—C_nF_{2n+1-h}H_h$ group or a $—C_uF_{2u-u'}H_{u'}OC_wF_{2w+1-w'}H_{w'}$ group, as defined above;

$R_f$, J, j and r have the same meaning as defined above.

Hydrofluoroethers typically comply with formula (II A) or (II B) as described above, wherein:

r is equal to 0;

R* and R*', equal or different from each other, have the same meaning as defined above;

$R_f$, J and j have the same meaning as defined above.

Representative hydrofluoroethers of formula (II A) include, but are not limited to, the following compounds and mixtures thereof: $C_3F_7OCH_3$, $C_4F_9OCH_3$, $C_4F_9OC_2H_5$, $C_7F_{15}OC_2H_5$.

Representative hydrofluoroethers of formula (II B) include, but are not limited to, the following compounds and mixtures thereof: $CF_3CFHCF_2CH(CH_3)OCF_2CFHCF_3$, $CF_3CFHCF_2CH_2OCF_2CFHCF_3$, $CF_3CF(CH_2OCF_2CFHCF_3)CFHCF(CF_3)_2$, $CF_3CFHCF(CH_2OCF_2CFHCF_3)CF(CF_3)_2$, $CF_3CF[CH(CH_3)OCF_2CFHCF_3]CFHCF(CF_3)_2$, $CF_3CF[CH(CH_3)OCF_2CFHCF_3]CFHCF_2CF_3$, $CF_3CF_2CF[CH(CH_3)OCF_2CFHCF_3]CFHCF_3$, $CF_3CFHCF_2C(CH_3)_2OCF_2CFHCF_3$, $CF_3CFHCF_2CH_2OCF_2CFHOC_4F_9$, $CF_3CFHCF_2CH(OCF_2CFHCF_3)CH_2OCF_2CFHCF_3$, $CF_3CFHCF_2CH_2OCF_2CFHOC_3F_7$, $CF_3CFHCF_2CH_2OCF_2CFHOCF_3$, $CF_3CF_2CF_2OCH_2CH_2CH_2OCF_2CF_2CF_3$, $CF_3CF_2CF_2CF_2OCH_2CH_2CH_2OCF_2CF_2CF_2CF_3$, $CF_3CF_2CF_2OCH_2CH_2OCF_2CF_2CF_3$, $CF_3CF_2CF_2CF_2CF_2OCH_2CH_2CH_2OCF_2CF_2CF_2CF_2CF_3$, $CF_3CF_2CF[CF(CF_3)_2]OCH_2CH_2CH_2OCF[CF(CF_3)_2]CF_2CF_3$.

Hydrofluoropolyethers typically comply with formula (II A) as described above, wherein:

R* and R*', equal or different from each other, are independently chosen among $—C_mF_{2m+1}$, $—C_nF_{2n+1-h}H_h$, $—C_uF_{2u-u'}H_{u'}OC_wF_{2w+1-w'}H_{w'}$, $—C_uF_{2u-u'}H_{u'}OC_yF_{2y+1}$ groups, with m, n, u, w, y being integers from 1 to 8, preferably from 1 to 7, h, u' and w' being integers≥1, chosen so that h≤2n+1, u'≤2u, w'≤2w+1;

$R_f$ has the same meaning as defined above;

r is equal to 1.

Suitable hydrofluoropolyethers preferably have general formula (III A-1):

$$R^*O—R_f'—R^{*\prime} \quad \text{(III A-1)},$$

wherein:

R* and R*', equal or different from each other, are independently chosen between $—C_mF_{2m+1}$ and $—C_nF_{2n+1-h}H_h$ groups, with m, n being integers from 1 to 3, h being integer ≥1, chosen so that h≤2n+1, with the proviso that at least one of R* and R*' is a $—C_nF_{2n+1-h}H_h$ group, as defined above;

$R_f'$ is chosen among the following:

(1) $—(CF_2O)_a—(CF_2CF_2O)_b—(CF_2—(CF_2)_{z'}—CF_2O)_c$, with a, b and c being integers up to 100, preferably up to 50, and z' being an integer equal to 1 or 2, a≥0, b≥0, c≥0 and a+b>0; preferably, each of a and b being >0 and b/a being comprised between 0.1 and 10;

(2) $—(C_3F_6O)_{c'}—(C_2F_4O)_b—(CFXO)_t—$, with X being, at each occurrence, independently selected among —F and $—CF_3$; b, c' and t being integers up to 100, c'>0, b≥0, t≥0; preferably, b and t>0, c'/b being comprised between 0.2 and 5.0 and (c'+b)/t being comprised between 5 and 50;

(3) $—(C_3F_6O)_{c'}—(CFXO)_t—$, with X being, at each occurrence, independently selected among —F and $—CF_3$; c' and t being integers up to 100, c'>0, t≥0, preferably t>0, c'/t being comprised between 5 and 50.

$R_f'$ in formula (III A-1) is preferably selected among structures (1) and (2), as described above.

Non limiting examples of hydrofluoropolyethers described by formula (III A-1) include, but are not limited to, the following compounds and mixtures thereof: $HCF_2O(CF_2CF_2O)CF_2H$; $HCF_2O(CF_2CF_2O)_2CF_2H$; $HCF_2O(CF_2CF_2O)_2(CF_2O)_2CF_2H$; $HCF_2O(CF_2CF_2O)_3CF_2H$; $HCF_2O(CF_2CF_2O)_3(CF_2O)_2CF_2H$; $HCF_2O(CF_2CF_2O)_4CF_2H$; $HCF_2O(CF_2CF_2O)_3CF_2OCF_2H$; $HCF_2O(CF_2CF_2O)_4CF_2OCF_2H$; $CF_3O(CF_2CF_2O)_2CF_2H$; $CF_3O(CF_2CF_2O)_2(CF_2O)CF_2H$; $CF_3O(CF_2CF_2O)(CF_2O)_2CF_2H$; $CF_3O(CF_2CF_2O)_2(CF_2O)_2CF_2H$; $CF_3O(CF_2CF(CF_3)O)_2CF_2H$; $CF_3O(CF_2CF(CF_3)O)_3CF_2H$; $CF_3O(C_3F_6O)_2(CF(CF_3)O)CF_2H$; $HCF_2CF_2O(CF_2CF_2O)CF_2CF_2H$; $HCF_2CF_2OCF_2C(CF_3)_2CF_2OCF_2CF_2H$; $CH_3OCF_2CF_2OCH_3$; $CH_3O(CF_2CF_2O)_2CH_3$; $CH_3O(CF_2CF_2O)(CF_2O)(CF_2CF_2O)CH_3$; $CH_3O(CF_2CF_2O)_3CH_3$; $CH_3O(CF_2CF_2O)(CF_2O)_2(CF_2CF_2O)CH_3$; $C_2H_5OCF_2CF_2OC_2H_5$; $C_2H_5O(CF_2CF_2O)_2C_2H_5$; $CH_3OCF_2H$; $CH_3OCF_2CF_2OCF_2H$; $CH_3OCF_2CF_2OCF_2OCF_2H$; $C_2H_5OCF_2H$; $C_2H_5OCF_2CF_2OCF_2H$; $C_2H_5O(CF_2CF_2O)_2CF_2H$.

Suitable hydrofluoropolyethers are for instance those available from Solvay Solexis S.p.A. under the tradenames H-GALDEN® ZT 60, H-GALDEN® ZT 85, H-GALDEN® ZT 100, H-GALDEN® ZT 130, H-GALDEN® ZT 150, H-GALDEN® ZT 180.

Preferably the fluorinated fluid used in the process is selected among the hydrofluoroethers described above.

Fluids selected from the above described classes of hydrofluoropolyethers and hydrofluoroethers, are quite effective in dissolving sulfonyl fluoride polymeric fractions having an average content of monomeric units comprising at least one sulfonyl fluoride functional group greater than 24 mole %. Accordingly, said polymeric fractions can be efficiently removed from a sulfonyl fluoride polymer with the inventive process. The Applicant has found that reducing the content of said polymeric fractions below 15% by weight does not negatively impact the good proton and water transport capabilities of the ionomers derived from sulfonyl fluoride polymers with a heat of fusion not exceeding 4 J/g but at the same time reduces the loss of weight when membranes made of said ionomers are used in fuel cells.

The sulfonyl fluoride polymer has a heat of fusion, as measured according to ASTM D3418-08, not exceeding 4 J/g, preferably not exceeding 3 J/g, more preferably not exceeding 2 J/g. The sulfonyl fluoride polymer is amorphous.

According to the present specification a sulfonyl fluoride polymer comprises recurring units derived from at least one ethylenically unsaturated fluorinated monomer (A) containing at least one sulfonyl fluoride functional group and at least one ethylenically unsaturated fluorinated monomer (B).

The phrase “at least one monomer” is used herein with reference to monomers of both type (A) and (B) to indicate that one or more than one monomer of each type can be present in the polymer. Hereinafter the term monomer will be used to refer to one or more than one monomer of a given type.

Non limiting examples of suitable monomers (A) are:

- sulfonyl fluoride (per)fluoroolefins of formula: $CF_2=CF(CF_2)_{n'}SO_2F$ wherein n' is an integer between 0 and 10, preferably between 1 and 6, more preferably n' is equal to 2 or 3;
- sulfonyl fluoride (per)fluorovinylethers of formula: $CF_2=CF—O—(CF_2)_{m'}SO_2F$ wherein m' is an integer between 1 and 10, preferably between 1 and 6, more preferably between 2 and 4, even more preferably m' equals 2;
- sulfonyl fluoride (per)fluoroalkoxyvinylethers of formula: $CF_2=CF—(OCF_2CF(R_{F1}))_x—O—CF_2(CF(R_{F2}))_{y'}SO_2F$ wherein x is an integer between 0 and 2, $R_{F1}$ and $R_{F2}$, equal or different from each other, are independently —F, —Cl or a $C_1$-$C_{10}$ perfluoroalkyl group, optionally substituted with one or more ether oxygens, y' is an integer between 0 and 6; preferably x is 1, $R_{F1}$ is $—CF_3$, y' is 1 and $R_{F2}$ is —F;
- sulfonyl fluoride aromatic (per)fluoroolefins of formula $CF_2=CF—Ar—SO_2F$ wherein Ar is a $C_5$-$C_{15}$ aromatic or heteroaromatic substituent.

Preferably monomer (A) is selected from the group of the sulfonyl fluoride perfluorovinylethers of formula $CF_2=CF—O—(CF_2)_{m'}—SO_2F$, wherein m' is an integer between 1 and 6, preferably between 2 and 4.

More preferably monomer (A) is $CF_2=CFOCF_2CF_2—SO_2F$ (perfluoro-5-sulfonylfluoride-3-oxa-1-pentene).

Non limiting examples of suitable ethylenically unsaturated fluorinated monomers of type (B) are:

- $C_2$-$C_8$ (per)fluoroolefins, such as tetrafluoroethylene (TFE), pentafluoropropylene, hexafluoropropylene (HFP), and hexafluoroisobutylene;
- vinylidene fluoride (VDF);
- $C_2$-$C_8$ chloro- and/or bromo- and/or iodo-(per)fluoroolefins, such as chlorotrifluoroethylene (CTFE) and bromotrifluoroethylene;
- (per)fluoroalkylvinylethers of formula $CF_2=CFOR_{f1}$, wherein $R_{f1}$ is a $C_1$-$C_6$ (per)fluoroalkyl, e.g. $—CF_3$, $—C_2F_5$, $—C_3F_7$;

(per)fluoro-oxyalkylvinylethers of formula $CF_2{=}CFOX_O$, wherein $X_O$ is a $C_1$-$C_{12}$ perfluoro-oxyalkyl having one or more ether groups, for example perfluoro-2-propoxy-propyl;

fluoroalkyl-methoxy-vinylethers of formula $CF_2{=}CFOCF_2OR_{f2}$ in which $R_{f2}$ is a $C_1$-$C_6$ fluoro- or perfluoroalkyl, e.g. —$CF_3$, —$C_2F_5$, —$C_3F_7$ or a $C_1$-$C_6$ (per)fluorooxyalkyl having one or more ether groups, like —$C_2F_5$—O—$CF_3$;

fluorodioxoles, of formula:

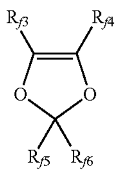

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, —$OCF_2CF_2OCF_3$.

Preferably monomer (B) is selected among:

$C_3$-$C_8$ perfluoroolefins, preferably tetrafluoroethylene (TFE) and/or hexafluoropropylene (HFP);

chloro- and/or bromo- and/or iodo-$C_2$-$C_6$ (per)fluoroolefins, like chlorotrifluoroethylene (CTFE) and/or bromotrifluoroethylene;

perfluoroalkylvinylethers of formula $CF_2{=}CFOR_{f1}$ in which $R_{f1}$ is a $C_1$-$C_6$ perfluoroalkyl, e.g. —$CF_3$, —$C_2F_5$, —$C_3F_7$;

perfluoro-oxyalkylvinylethers of formula $CF_2{=}CFOX_O$, in which $X_O$ is a $C_1$-$C_{12}$ perfluorooxyalkyl having one or more ether groups, like perfluoro-2-propoxy-propyl.

More preferably monomer (B) is TFE.

Optionally, in addition to monomers (A) and (B) the sulfonyl fluoride polymer may comprise recurring units derived from bis-olefins. Non limiting examples of suitable bis-olefins are selected form those of formulae below:

$R_1R_2C{=}CH$—$(CF_2)_j$—$CH{=}CR_3R_4$ wherein j is an integer between 2 and 10, preferably between 4 and 8, and $R_1$, $R_2$, $R_3$, $R_4$, equal or different from each other, are —H, —F or $C_1$-$C_5$ alkyl or (per)fluoroalkyl group;

$A_2C{=}CB$—O-E-O—$CB{=}CA_2$, wherein each of A, equal or different from each other, is independently selected from —F, —Cl, and —H; each of B, equal or different from each other is independently selected from —F, —Cl, —H and —$OR_B$, wherein $R_B$ is a branched or straight chain alkyl radical which can be partially, substantially or completely fluorinated or chlorinated; E is a divalent group having 2 to 10 carbon atoms, optionally fluorinated, which may be inserted with ether linkages; preferably E is a —$(CF_2)_{z'}$— group, with z' being an integer from 3 to 5; a preferred bis-olefin is $F_2C{=}CF$—O—$(CF_2)_5$—O—$CF{=}CF_2$;

$R_6R_7C{=}CR_5$-E-O—$CB{=}CA_2$, wherein E, A and B have the same meaning as above defined; $R_5$, $R_6$, $R_7$, equal or different from each other, are —H, —F or $C_1$-$C_5$ alkyl or (per)fluoroalkyl group.

When a bis-olefin is employed in the polymerization process of the invention the resulting polymer typically comprises from 0.01% to 5% by moles of units deriving from the bis-olefin with respect to the total amount of units in the polymer.

Typically, the sulfonyl fluoride polymer is free of recurring units derived from bis-olefins as defined above.

Preferably, the sulfonyl fluoride polymer consists of recurring units derived from at least one ethylenically unsaturated fluorinated monomer (A) containing at least one sulfonyl fluoride functional group and at least one ethylenically unsaturated fluorinated monomer (B).

More preferably, the sulfonyl fluoride polymer consists of recurring units derived from TFE and $CF_2{=}CFOCF_2CF_2$—$SO_2F$.

The sulfonyl fluoride polymer may be conveniently obtained by any polymerization process known in the art. Suitable processes for the preparation of the sulfonyl fluoride polymers are for instance those described in U.S. Pat. No. 4,940,525, EP-A-1,167,400, EP-A-1,323,751, EP-A-1,172,382.

The sulfonyl fluoride polymer may be subjected to conventional polymer post-treatment procedures before or after being treated with the fluorinated fluid. For instance, the polymer may undergo a fluorination treatment to remove unstable chain-end groups as known in the art.

The treatment of the sulfonyl fluoride polymer with the fluorinated fluid is carried out on the polymer in solid form, for instance in granular, powder or pellet form. Suitable powders for the inventive process are those having a mean particle size of at least 1 μm. Granules and pellets of the sulfonyl fluoride polymer generally have a mean particle size of at least 1000 μm, typically of at least 1200 μm, even at least 1500 μm. The treatment may also be carried out on films or sheets made of, or comprising, the sulfonyl fluoride polymer. Preferably, the process is carried out on the polymer in pellet or granular form.

The step of treating the polymer with the fluorinated fluid can be carried out in any conventional manner, typically under suitable stirring or agitation.

Typically the amount by weight of fluorinated fluid used in the process is at least equal to the amount by weight of the sulfonyl fluoride polymer to be treated. The ratio by weight of the fluorinated fluid with respect to the sulfonyl fluoride polymer to be treated is generally at least 2:1, preferably 3:1, more preferably 5:1 and even up to 10:1. Higher ratios could be used in the inventive process however they would not be practical.

The process of the invention is typically carried out at a temperature of at least −40° C. and not exceeding 80° C. In general the process is carried out at temperatures in the range from 0 to 70° C., preferably in the range from 10 to 60° C. The process may conveniently be carried out at room temperature.

The contact time between the polymer and the fluorinated fluid is at least 1 minute, preferably at least 30 minutes, more preferably at least 1 hour. The contact time is typically in the order of from 10 to 100 hours, more typically from 15 to 90 hours and even from 24 to 72 hours.

At the end of the process the solid polymer is separated from the fluorinated fluid. The separation of the solid sulfonyl fluoride polymer from the fluorinated fluid can be performed in any conventional manner, such as by filtration, centrifugation or decantation. Typically the polymer is dried and the fluorinated fluid recovered. Polymeric fractions having an average content of monomeric units comprising at least one sulfonyl fluoride functional group greater than 24 mole % are dissolved in the fluorinated fluid separated from the solid sulfonyl fluoride polymer. The solid polymer separated from the fluorinated fluid contains less than 15% by weight of said polymeric fractions.

A second object of the present invention is a sulfonyl fluoride polymer comprising recurring units derived from: at least one monomer (A) and at least one monomer (B), said polymer having a heat of fusion not exceeding 4 J/g and containing less than 15% by weight of polymeric fractions having an average content of monomeric units comprising at least one sulfonyl fluoride functional group, that is units derived from monomer (A), greater than 24 mole %.

The average content of monomeric units comprising at least one sulfonyl fluoride functional group may determined for instance by means of $^{19}F$ NMR spectroscopy or of IR spectroscopy.

Monomers (A) and (B) are as defined above.

Preferably the sulfonyl fluoride polymer comprises recurring units derived from TFE and $CF_2{=}CFOCF_2CF_2{-}SO_2F$. More preferably the sulfonyl fluoride polymer consists of recurring units derived from TFE and $CF_2{=}CFOCF_2CF_2{-}SO_2F$.

The polymer has a heat of fusion not exceeding 4 J/g, preferably not exceeding 3 J/g, more preferably not exceeding 2 J/g, as measured according to ASTM D3418-08.

In the sulfonyl fluoride polymer the content of polymeric fractions having an average content of monomeric units comprising at least one sulfonyl fluoride group greater than 24.5 mole % is less than 15% by weight, preferably less than 10% by weight, more preferably less than 5% by weight, still more preferably less than 2% by weight, even more preferably less than 1% by weight.

In an embodiment of the invention the sulfonyl fluoride polymer contains less than 10% by weight, preferably less than 5% by weight, more preferably less than 2% by weight and even more preferably less than 1% by weight of polymeric fractions having an average content of monomeric units comprising at least one sulfonyl fluoride group greater than 25 mole %.

In another embodiment of the invention the sulfonyl fluoride polymer contains less than 10% by weight, preferably less than 5% by weight, more preferably less than 2% by weight, still more preferably less than 1% by weight of polymeric fractions having an average content of monomeric units comprising at least one sulfonyl fluoride group greater than 25.5 mole %.

In a further embodiment of the invention the sulfonyl fluoride polymer contains less than 10% by weight, preferably less than 5% by weight, more preferably less than 2% by weight, still more preferably less than 1% by weight of polymeric fractions having an average content of monomeric units comprising at least one sulfonyl fluoride group greater than 26 mole %.

The Applicant has found that, when in use in a fuel cell, films or membranes obtained from the sulfonyl fluoride polymer as defined above in acid form, are provided with increased durability.

The Applicant has in fact observed that said membranes show a reduced loss of weight after treatment in water at 100° C. when compared with membranes obtained from sulfonyl fluoride polymers which have not been treated according to the inventive process. Without being bound by theory the Applicant believes that the loss of weight in water at 100° C. is directly related to the amount of polymeric fractions having an average content of monomeric units comprising a sulfonyl fluoride group greater than 24 mole % contained in the polymer or polymer composition.

The improvement, i.e. reduction, in the loss of weight after treatment in water at 100° C. is already significant after 24 hours of testing but it is even more significant after longer treatment in water, in particular after 96 hours of testing. The reduction in the loss of weight of the membrane at long treatments in water is particularly advantageous in view of the final use of the membrane, i.e. the use in fuel cells for automotive applications wherein expected life-span is in the order of the thousand hours.

In particular, membranes comprising the sulfonyl fluoride polymer obtained from the inventive process in acid form show a loss of weight of less than 10%, typically less than 5% and even of less than 1% after treatment in water at 100° C. for 96 hours.

The films or membranes may be prepared by casting or by extrusion of the sulfonyl fluoride polymer followed by hydrolysis, i.e. conversion of the sulfonyl fluoride polymer making the film into the corresponding acid form, according to methods known in the art.

The membranes may optionally be reinforced, for instance by lamination of an extruded film to a porous support or by impregnation of the support with a suitable dispersion of the polymer. Lamination and impregnation may be carried out by conventional methods.

Porous supports may be made from a wide variety of components. The porous supports may be made from hydrocarbon polymers such as polyolefins, e.g. polyethylene or polypropylene, or polyesters, e.g. poly(ethylene terephthalate). (Per)halogenated polymers, such as poly(tetrafluoroethylene), poly(chlorotrifluoroethylene) and copolymers of chlorotrifluoroethylene and ethylene may also be used.

Should the disclosure of any of the patents, patent applications, and publications that are incorporated herein by reference conflict with the present description to the extent that it might render a term unclear, the present description shall take precedence.

The invention will be illustrated by means of the following non-limiting examples.

EXAMPLES

Characterization

Molar content of monomeric units was determined by $^{19}F$ NMR using a Varian Inova 400 NMR Spectrometer operating at 376.198 MHz for $^{19}F$. About 30 mg of polymer was loaded into a NMR 0.5 mm tube and dissolved in 0.5 mL of hexafluorobenzene.

In the case of copolymers of TFE and $CF_2{=}CFOCF_2CF_2{-}SO_2F$ the molar content of the monomeric units was determined on the basis of the following chemical shifts assignments (referred to the $C_6F_6$ solvent signal at −164.67 ppm): 45.2 ppm ($-SO_2\underline{F}$); −77.5 ppm ($-OC\underline{F_2}CF_2SO_2F$); −111.3 ppm ($-OCF_2C\underline{F_2}SO_2F$); −115/−122 ppm ($-C\underline{F_2}-CF-(OCF_2CF_2SO_2F)-$, $-C\underline{F_2}CF_2-$); −132/−137 ppm ($-CF_2-C\underline{F}-(OCF_2CF_2SO_2F)-$).

Heat of fusion was determined by DSC following the procedure of ASTM D3418-08. As specifically provided by this standard, heat of fusion was determined from second heating curve at a heat rate of 10° C./min, after having suppressed effects of thermal history of the sample in a first heating cycle and subsequent cooling in well-defined conditions.

Preparation of Ionomer Films and Determination of Their Weight Loss in Water at 100° C.

Sulfonyl fluoride polymer pellets were compression molded in order to obtain 100-200 micron thick film, which was converted in the $-SO_3H$ form by hydrolysis in KOH (80° C. for 8 hours) followed by acidification treatment in nitric acid and several washing steps in distilled water at room temperature. Two samples with a size of 25×50 mm approximately were obtained. The initial weight ($W_{in}$) was measured after drying at 105° C. in a preheated vacuum oven until constant weight. Dried samples were put into a sealed vessel filled with 120 mL of distilled water and then placed into a heating oven at 100° C. After 24 hours heating was stopped. The samples were extracted from the vessel and dried to constant weight ($W_{fin24}$) in a vacuum oven at 105° C. as described above.

The weight loss after 24 hours of treatment in water at 100° C. was calculated as follows:

$$\text{weight}_{LOSS-24} = -\frac{W_{fin24} - W_{in}}{W_{in}} \cdot 100$$

With a similar procedure pre-dried samples were maintained in oven at 100° C. in 120 mL of distilled water for 96 hours. The final weight of each sample ($W_{fin96}$) was recorded after drying in vacuum oven at 105° C. to constant weight. The weight loss after 96 hours treatment in water at 100° C. was calculated as follows:

$$\text{weight}_{LOSS-96} = -\frac{W_{fin96} - W_{in}}{W_{in}} \cdot 100$$

Example 1

Sulfonyl Fluoride Polymer Preparation

In a 22 liter reactor, were introduced the following reactants: 3100 g of an aqueous solution containing 5% by weight of a surfactant of formula $CF_2ClO(CF_2CF(CF_3)O)_p(CF_2O)_qCF_2COOK$ (p/q=10, average molecular weight 527 g/mol) and 95% by weight of water; 9 of deionized water; 756 mL of the monomer of formula $CF_2{=}CFOCF_2CF_2{-}SO_2F$.

The reactor, stirred at 470 rpm, was heated up to 50° C. The pressure inside the reactor was brought to 1 absolute MPa with a mixture of carbon dioxide and TFE. The partial pressure of TFE inside the reactor was 0.5 MPa·300 mL of an aqueous solution having a concentration of 6 g/L of potassium persulphate were fed into the reactor causing an increase in the pressure. The reaction started immediately as indicated by the lowering of the pressure within the reactor to its initial value. The pressure was maintained constant by introducing TFE. During the polymerization, 160 mL of $CF_2{=}CFOCF_2CF_2{-}SO_2F$ were added every 200 g of TFE. The total mass of TFE fed into the reactor was 4000 g. The reaction was stopped after 234 min by venting TFE and successively lowering the reactor pressure. At the end of this operation, stirring was slowed down and the reactor brought to ambient pressure and temperature recovering a polymerization latex with a solid content of 33% by weight.

The polymer latex was coagulated by freezing and thawing and the recovered polymer (P1) was washed with water and dried for 40 hours at 80° C. The obtained polymer had a heat of fusion of 1.05 J/g and an average content of $CF_2{=}CFOCF_2CF_2{-}SO_2F$ of 22.1 mole %.

A film was obtained from P1, hydrolysed and tested for the determination of the weight loss in water at 100° C. according to the procedure described above. The loss of weight after 24 and 96 hours was found to be 8.2 and 24.1%, respectively.

Polymer Treatment 3 kg of polymer P1 were dried and pelletized in a melt extruder. The pellets were introduced in a 50 liter reactor, then 30 kg of methoxy-nonafluorobutane $C_4F_9OCH_3$ (supplied by 3M under the trade name Novec™ HFE7100) were added. The reactor was stirred at 10 rpm and maintained at room temperature. After 24 hours, the stirring was stopped and the polymer was separated from the fluid by extracting the fluid phase from the lower part of the reactor.

The polymer after the treatment ($P1_{treat}$) was dried at 80° C. for 24 hours in a ventilated oven and then for 8 hours at 80° C. in a vacuum oven.

The obtained polymer had a heat of fusion of 1.21 J/g and an average content of $CF_2{=}CFOCF_2CF_2{-}SO_2F$ of 21 mole %.

A film was obtained from $P1_{treat}$, hydrolysed and tested for the determination of the weight loss in water at 100° C. according to the procedure described above. The loss of weight after 24 and 96 hours was found to be 0.5 and 0.8%, respectively.

The fluorinated fluid recovered from the reactor was evaporated in a ventilated oven at 80° C. providing 660 g of a solid ($P1_{extr}$). The solid was analysed by $^{19}F$ NMR spectroscopy and identified as a TFE/$CF_2{=}CFOCF_2CF_2{-}SO_2F$ copolymer having an average content of $CF_2{=}CFOCF_2CF_2{-}SO_2F$ of 27.8 mole %.

Example 2

Following the procedure of Example 1 a TFE/$CF_2{=}CFOCF_2CF_2{-}SO_2F$ copolymer (P2) was prepared having a heat of fusion of 1.6 J/g and an average content of $CF_2{=}CFOCF_2CF_2{-}SO_2F$ of 21 mole %.

The polymer was treated with methoxy-nonafluorobutane for 44 hours under the same conditions reported in Example 1. The obtained polymer ($P2_{treat}$) had a heat of fusion of 1.64 J/g and an average content of $CF_2{=}CFOCF_2CF_2{-}SO_2F$ of 20.6 mole %. The weight loss after 96 hours in water at 100° C. of a film made from $P2_{treat}$ in its acid form was 0.7%, determined according to the procedure described above.

The amount of polymer ($P2_{extr}$) recovered from the fluid after the treatment was 12% by weight of the starting weight of P2 and was found to have an average content of $CF_2{=}CFOCF_2CF_2{-}SO_2F$ of 25.6 mole %.

Further treatment, at room temperature, of the sulfonyl fluoride polymer obtained from the inventive process (e.g. $P1_{treat}$ or $P2_{treat}$) with a fluorinated fluid capable to dissolve sulfonyl fluoride polymers with an average content of monomeric units comprising a sulfonyl fluoride group greater than 24 mole %, such as methoxy-nonafluorobutane, may result in a moderate reduction in weight, typically of less than 15% by weight, more generally of less than 10% by weight.

The invention claimed is:

1. A process for reducing to less than 15% by weight the amount of polymeric fractions in which greater than 24 mole % of such polymeric fractions comprise monomeric units having at least one sulfonyl fluoride group, in a sulfonyl fluoride polymer having a heat of fusion not exceeding 4 J/g, measured according to ASTM 3418-08, said process comprising:

contacting said sulfonyl fluoride polymer with at least one fluorinated fluid selected from the group consisting of hydrofluoroethers and hydrofluoropolyethers for at least 1 minute to form a fluid phase and a polymer phase; and separating said fluid phase from said polymer phase.

2. The process according to claim 1 wherein the fluorinated fluid is a hydrofluoroether.

3. The process according to claim 1 wherein the sulfonyl fluoride polymer is contacted with the fluorinated fluid at a temperature of from −40° C. to no more than 80° C.

4. The process according to any claim 1 wherein the sulfonyl fluoride polymer is in pellet or granular form.

5. The process according to claim 1, wherein the process reduces to less than 10% by weight the amount of polymeric fractions in which greater than 25 mole % of such polymeric fractions comprise monomeric units having at least one sulfonyl fluoride group.

6. The process according to claim 1, wherein the sulfonyl fluoride polymer has a heat of fusion not exceeding 3 J/g.

7. The process according to claim 1, wherein the sulfonyl fluoride polymer comprises recurring units derived from $CF_2{=}CFOCF_2CF_2{-}SO_2F$ and tetrafluoroethylene.

* * * * *